Nov. 12, 1940.　　　A. K. PHILLIPPI　　　2,221,605
ROTOR
Filed June 9, 1937
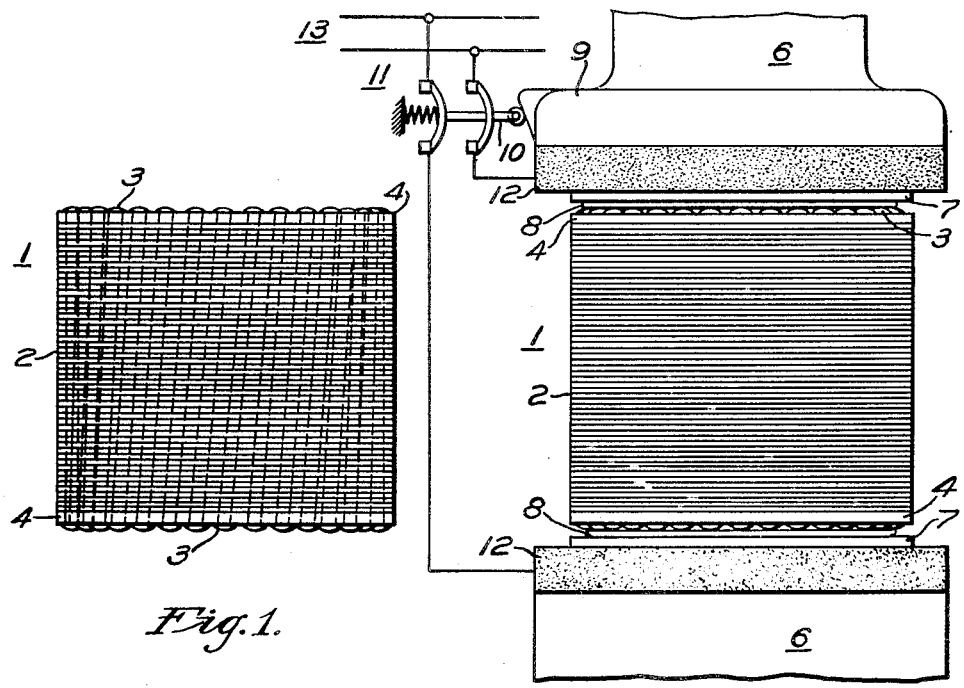
Fig.1.
Fig.2.
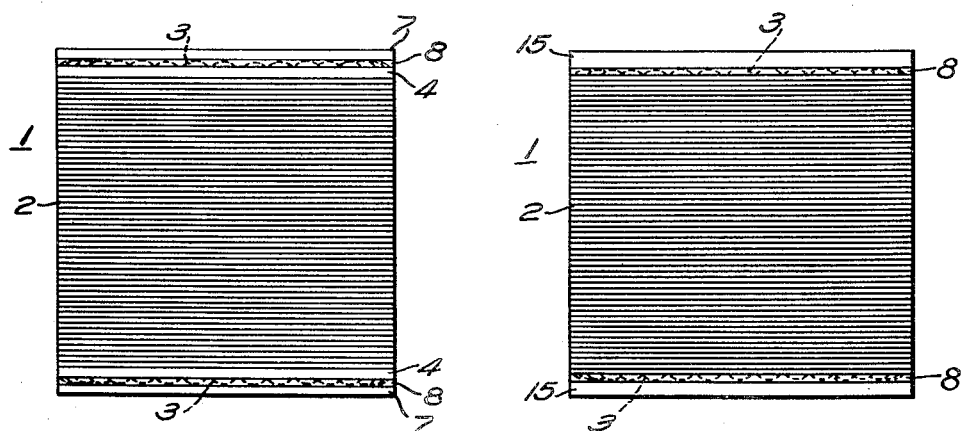
Fig.3.
Fig.4.
WITNESSES:
INVENTOR
Arthur K. Phillippi
BY
W. R. Coley
ATTORNEY Patented Nov. 12, 1940

2,221,605

UNITED STATES PATENT OFFICE 2,221,605

ROTOR

Arthur K. Phillippi, Wilbraham, Mass., assignor to Westinghouse Electric & Manufacturing Company, East Pittsburgh, Pa., a corporation of Pennsylvania Application June 9, 1937, Serial No. 147,234

3 Claims. (Cl. 172—120)

My invention relates to squirrel-cage rotors and more particularly to those squirrel-cage rotors whose conductor bars are connected together by means of a resistance ring of high conductivity.

Due to the inability with available equipment to punch an aperture into a plate of copper or the like with the smallest dimension thereof being less than the thickness of such material, the thickness of the short-circuiting rings of a squirrel-cage motor are limited by the smallest dimension of the conductor rods. This in turn limits the amount of conductivity capable of being obtained in the short-circuiting rings with a given material and restricts the field of application and the range of design for a given rotor.

It is, therefore, an object of my invention to provide an unlimited amount of conductivity through a short-circuiting ring regardless of the size or shape of the conductor rods.

A further object of my invention is to provide a short-circuiting ring structure of any thickness desired, such structure constituting either an integral ring or an additional ring for increasing the thickness of the short-circuiting rings which may already be on a particular rotor.

A further object of my invention is to provide means for securing a short-circuiting ring to the ends of a rotor or to the rings which may be located on such rotor and to keep the contact resistance thereof reduced to a minimum.

Other objects of my invention will either be pointed out specifically in the course of the following description of a device embodying my invention or will be apparent from such description.

In the accompanying drawing,

Figure 1 is an elevational view of a standard squirrel-cage rotor.

Fig. 2 is an elevational view of such a squirrel-cage rotor located within a press, in order that my invention may be applied to the rotor, Fig. 3 is a rotor embodying a double short circuiting ring constructed in accordance with my invention, and Fig. 4 is a rotor embodying a single short-circuiting ring constructed in accordance with my invention.

Referring to Fig. 1, I show a rotor 1 comprising a stack of laminations 2 and a plurality of conductor bars 3 extending therethrough in accordance with a familiar practice. A short-circuiting resistor ring 4 is located at each end of the rotor 1 and has the conductor bars 3 inserted through a plurality of apertures therein, as is customary. The conductor rods 3 may have their ends staked or headed over upon the short-circuiting ring 4 to make a rigid mechanical connection therewith.

The rotor 1, which as so far described, is not of my present invention nor claimed therein, may have additional short-circuiting rings 7 placed upon the ends thereof and rigidly attached thereto by any suitable bonding material 8, which may be placed between the auxiliary short-circuiting rings 7 and the rotor 1. The bonding material 8 may be phos-copper, silphos, silver or any other suitable material capable of making a good electrical contact between the auxiliary short-circuiting ring 7, the short-circuiting ring 4 and the ends of the conductor bars 3, as well as ensuring a rigid mechanical connection between the parts.

If desired, the rotor 1 may be assembled without any short-circuiting rings 4, the conductor rods 3 merely being headed over upon the laminated core to form a rigid solid rotor. The short-circuiting rings 15, (Fig. 4) being of any thickness desired, are then placed upon the ends of the rotor 1 and rigidly attached thereto by the bonding material 8.

It is obvious that rotors assembled in such a manner are capable of being built to various specifications by merely attaching thereto a short-circuiting ring having the desired resistance characteristic. This procedure performs a dual purpose; namely, permitting the construction of the laminated core portion of the rotor with mass-production methods, with the reduced costs incident thereto, and permitting the attachment of specific short-circuiting rings, which enable a completed rotor to have any desired characteristic, at a cost equivalent to those rotors produced in large quantities.

In a similar manner, the rotor may be assembled by having the laminations and the conductor bars cut to the desired size and assembled with the required short-circuiting ring during one operation. Assembled in such a manner the bonding material in association with the short circuiting rings eliminates the necessity of staking the conductor rods while increasing flexibility in the desgn thereof and reducing the cost of manufacture.

In constructing the rotors as hereinabove described, the rotor 1 and the auxiliary short-circuiting rings 7, with the bonding material 8 located therebetween, may be placed within a suitable press 6. The jaws of such press 6 are comprised of suitable electrodes 12 which are connected to a power supply 13 through a switch 11.

Pressure is then applied by the press 6 through the electrodes 12 to the rotor 1, and as an upper or movable plunger 9 of the press 6 moves downwardly, due to the flattening out of the bonding material 8, such plunger contacts a movable element 10 of the switch 11 to close the same, whereupon power is applied to the electrodes 12, located on the jaws of the press 6. As a result, due to the voltage of the power supplied being set at a predetermined value, a sufficient quantity of current will flow through the auxiliary short-circuiting rings 7, the bonding material 8, and the conductor bars 3, causing the bonding material 8 to reach its melting temperature and fuse the two adjacent short-circuiting rings together, as well as the conductor bars to both rings. Due to the presence of the headed end portions of the conductor bars being located between the two adjacent resistor rings 4 and 7, such rings will be held apart. However, the bonding material 8, after fusing the rings together will fill this space and give the appearance of a solid short-circuiting ring as illustrated in Fig. 3. It is, therefore, obvious that due to the presence of the bonding material 8 located in juxtaposition with the ends of the conductor bar and the short-circuiting rings 7 and 4, the contact resistance between such conductor bars and short-circuiting rings will be of a relatively low value, and that due to the bonding material fusing with the short-circuiting rings, the auxiliary ring will be rigidly attached to the rotor.

If it is desired, the conductor bars 3 may be headed over or staked directly upon the laminations 2 of the rotor 1, permitting the elimination of the resistor rings 4. In such a case, the rotor 1, without the resistor ring 4 being located thereon, may be placed within the press 6 and short-circuiting rings 15, of any desired precalculated thickness, may be brazed or fused thereto as hereinabove described. A rotor constructed in such a manner will have the same general appearance as that of the previously described rotor, except the short-circuiting ring 15 will be fused directly upon the laminated structure 2 and in contact with the conductor bars 3, assuring a rigid connection with such laminated core and a low contact resistance with the conductor bars.

Utilizing this method of construction of a squirrel-cage rotor, it is obvious that the laminated core section 2 in association with the conductor bars 3 therethrough may be of stock material, merely requiring the addition of any particularly calculated or designed short-circuiting ring 15 to give the desired operating characteristics.

If desired, the short-circuiting ring 15 may be attached to the rotor 1 while assembling the laminated core section 2 with the conductor bars 3 therethrough, it being only necessary to calculate the required lengths of the conductor bars 3 for a given size rotor. This then eliminates the necessity of heading over or staking the ends of the conductor bars 3, since the bonding material 8 and short-circuiting rings 15 may be placed in position upon the rotor during the assembling thereof. With such a method of construction it is only necessary to withhold the application of current until the rotor has been formed to the proper size. Then with the application of current the bonding material 8 will fuse the short-circuiting rings 15 directly to the ends of the conductor bars 3, ensuring a low contact resistance and rigid connection therewith. Should any of the conductor bars 3 be slightly shorter than that required, the bonding material 8 will fill the cavity, guaranteeing the desired electrical and mechanical connection between such bar and the short-circuiting ring.

It is to be understood that the duration of the fusing current applied is very short and that due to such limited time of application of the fusing current, the conductor bars and short-circuiting rings will not be softened, since the bonding material will fuse the auxiliary short-circuiting ring to the conductor bars or the regular short circuiting ring before such rings and bars are greatly increased in temperature.

It is, therefore, obvious that by using this method of construction for a squirrel-cage rotor, the short-circuiting rings thereof may have an unlimited range of conductivity, depending upon the size desired, that a rotor of the present construction may have the thickness of its short-circuiting rings increased to any desired value, and that such rings may have flat surfaces without the necessity of having apertures therein, which, in turn, permits an unlimited field of application and range of design for such rotors.

Various further modifications may be made in the device embodying my invention without departing from the spirit and scope thereof and I desire, therefore, that only such limitations shall be placed thereon as are imposed by the prior art and the appended claims.

I claim as my invention:

1. A rotor member for a dynamo-electric machine comprising a laminated core structure, a plurality of conducting bars supported in the core and extending longitudinally thereof, a short-circuiting ring at the end of the core, said ring having apertures through which the bars extend, the ends of said bars being headed over against the outer surface of the ring, and an imperforate short-circuiting ring disposed against the headed ends of the bars and secured thereto with a good electrical and mechanical connection.

2. A rotor member for a dynamo-electric machine comprising a laminated core structure, a plurality of conducting bars supported in the core and extending longitudinally thereof, a short-circuiting ring at the end of the core, said ring having apertures through which the bars extend, the ends of said bars being headed over against the outer surface of the ring, and an imperforate short-circuiting ring disposed against the headed ends of the bars and secured thereto by means of a fusible metal.

3. A rotor member for a dynamo-electric machine comprising a laminated core structure, a plurality of conducting bars supported in the core and extending longitudinally thereof, a short-circuiting ring at the end of the core, said ring having apertures through which the bars extend, the ends of said bars being headed over against the outer surface of the ring, and an imperforate short-circuiting ring disposed against the headed ends of the bars and secured thereto by means of a fusible metal, said fusible metal substantially filling the spaces between the bars and between the two rings.

ARTHUR K. PHILLIPPI.